(12) United States Patent
Bock

(10) Patent No.: US 6,293,245 B1
(45) Date of Patent: Sep. 25, 2001

(54) SEALING-FAIL SAFE LEAKAGE CONTROL IN A CYLINDER HEAD JOINT

(75) Inventor: Allyn P. Bock, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/481,646

(22) Filed: Jan. 12, 2000

(51) Int. Cl.[7] .................................................. F16J 15/12
(52) U.S. Cl. ........................................................ 123/198 D
(58) Field of Search ................................... 277/593, 594, 277/597, 598, 599; 123/198 D, 41.15

(56) References Cited

U.S. PATENT DOCUMENTS

| | | | |
|---|---|---|---|
| 2,679,241 | * 5/1954 | Dickson | 277/595 |
| 4,312,512 | * 1/1982 | Conte et al. | 277/593 |
| 5,603,515 | 2/1997 | Bock . | |

OTHER PUBLICATIONS

Parker Seals, "Gask–O–Seal Handbook", pp 1–3. 10, 12, 13
Brochure, Precision Rubber Prod Corporation; "Composite Gaskets"4, 88.

\* cited by examiner

Primary Examiner—Tony M. Argenbright
Assistant Examiner—Hyder Ali
(74) Attorney, Agent, or Firm—Andrew M. Calderon

(57) ABSTRACT

A cylinder head sealing system having a fail safe leakage control system. The fail safe leakage control system provides a leakage fluid path which allows any sealed fluid to leak externally from a cylinder head joint and not contaminate any other vital fluids. This feature permits the engine to "limp home" or continue operation until a permanent repair can be made to the engine. Thus, when a seal of the internal combustion engine fails, the fluid may flow within the fluid leakage paths externally from the cylinder head joint which prevents the fluid from flowing within the cylinder or other engine ports and contaminating the fluids therein.

17 Claims, 4 Drawing Sheets

SEALING-FAIL SAFE LEAKAGE CONTROL IN A CYLINDER HEAD JOINT

TECHNICAL FIELD

This invention relates to a cylinder head sealing system and more particularly to a cylinder head sealing system having a leak path which enables fluids to flow externally of the cylinder head joint during a gasket seal failure.

BACKGROUND ART

Internal combustion engines are complex mechanisms which typically provide power to a vast array of machines including, for example, power generation sets, earth working machinery, paving machinery, load transfer carrying machinery and the like. In order to remove excess heat from the engine and to keep the engine operating at its most efficient temperature, a cooling and lubricating system is used to provide coolant and lubricant, respectively, to the engine.

Typical cooling systems include air and liquid cooling systems, with liquid cooling systems being most important to larger engines which power heavy machinery and the like. In liquid cooling systems, an array of passages throughout the engine including the cylinder block and head are provided. These cooling passages allow coolant to cool such engine parts as the combustion chamber, cylinder walls, and valve seats and guides, and ensures that the engine is operating at the most efficient temperature.

Similar to the coolant system, lubricating systems also include several passages throughout the engine, but instead provides lubricants, such as oil to the cylinder chamber, engine bearings and other locations. With respect to the cylinder chamber, the oil lubricates and cools the piston so as to decrease the friction between the piston and cylinder. Also, without lubricant, the engine may seize due to increased temperature resulting from the increased heat resulting from friction between the piston and cylinder wall.

Gaskets are typically provided at the cylinder head joint (between the cylinder head and block) in order to safeguard against leakage of fluids, and more specifically to prevent coolant, oil and the like from contaminating each other and being contaminated with other fluids. As a further benefit, gaskets assist in maintaining a proper operating pressure within the combustion chamber. Typical gaskets are made of steel, copper, graphite and fibrous materials; however, due to the thermal cycling of the engine during heating and cooling periods, the gaskets have to be elastomeric so as to adapt to the expansion and contraction of the engine during such heating and cooling periods.

It is not uncommon for gaskets, and especially cylinder head gaskets, to fail (e.g., "blowout", "wear" or become "loose") during the natural thermal loading of the engine. In the case of gasket seal failure, the gaskets typically fail at the weakest point which is the thinnest area between adjacent cylinders and the like. The failure (e.g., cracking, burning and the like) of the gasket may lead to contamination of fluids, such as, for example, coolant entering the crankcase or cylinder and mixing with the engine oil or combustion gases. This will dilute the engine oil and thus accelerate the wear of the engine. If enough coolant leaks into a cylinder, it may even "hydrolock" the engine.

It is further noted that the sealing of the cylinder head joint is particularly important in high compression diesel engines. This is because many high compression diesel engines employ flanged cylinder liners which may complicate the sealing of the cylinder head to the cylinder block. In engines which employ flanged cylinder liners, a spacer plate or plates are provided in the cylinder head joint between the cylinder head and block so as to evenly distribute the high unit loadings throughout the cylinder block and to further avoid associated crack initiation where the flange of the cylinder liner engages the cylinder block. The spacer plate or plates further provide a clearance for the flange of the cylinder liner to be mounted on the cylinder block in the cylinder head joint which eliminates the need for a counter bore in the cylinder block. This counter bore may contribute to an increase in crack initiation in the cylinder block.

In current diesel engines that employ flanged cylinder liners and spacer plates, gaskets clamped between the cylinder block and spacer plate and between the spacer plate and cylinder head are required. These gaskets appear to adequately seal across the cylinder head joint, but nevertheless can be subject to leakage due to thermal loading during engine expansion and contraction cycles. Thus, in these systems, the coolant is capable of leaking into the cylinder and contaminating the oil and other gases. This, of course, may result in reduced efficiency of the engine.

As a result of these problems, several gaskets have been developed in an attempt to improve sealing between the cylinder head and cylinder block. For example, U.S. Pat. No. 5,603,515 to Bock (February 1997) discloses a cylinder head sealing system with removable engine sealing gaskets. In particular, Bock discloses a thermally conductive sealing system for the cylinder head joint of an internal combustion engine comprising a spacer plate clamped in direct contact between the cylinder head and the cylinder block and a plurality of discrete fluid gaskets disposed across the spacer plate and clamped between the cylinder head and cylinder block. Although the Bock system provides an adequate sealing system, in case of failure of any one of the discrete gaskets during thermal loading, coolant or air may enter the cylinder compartment and contaminate the engine oil and gases therein. This would reduce the efficiency of the engine.

By way of further examples, several gasket manufacturers also have developed gaskets having increased sealing capabilities. Some of these manufactures have manufactured a near zero leakage sealing gasket which may be discrete elastomeric gaskets permanently retained in opposing grooves of a metal or plastic retainer. These systems may provide for improved sealing, but in case of gasket failure coolant or other fluids may still enter the cylinder compartment and mix with the engine oil and gases.

In attempting to solve the leakage problem posed by failed seals and gaskets, fluid leakage paths have also been machined within the cylinder head and/or cylinder block. However, these machined passages contribute to an increase in crack initiation in the cylinder block. Thus, in some instances, the use of machined fluid leakage paths within the cylinder head and/or cylinder block lead to a catastrophic failure of the engine.

The present invention is directed to overcoming one or more of the problems as set forth above.

DISCLOSURE OF THE INVENTION

In one aspect of the present invention a fail safe leakage control system for an engine is provided. The fail safe leakage control system includes a carrier plate positioned at a cylinder head joint. Molded or formed on the carrier plate are gaskets formed on opposing surfaces thereof. A fluid leakage path is formed between the surface of the cylinder head joint and the carrier plate and external to one of the gaskets formed on the surfaces of the carrier plate.

In another aspect of the present invention, a fail safe leakage control system for an internal combustion engine is provided. This fail safe leakage control system includes a carrier plate having opposing surfaces and positioned within a cylinder head joint. A gasket is positioned on each of the opposing surfaces of the carrier plate and forms a seal between each of the opposing surfaces and the respective surface of the cylinder head joint. A fluid leakage path is formed between the surfaces of the cylinder head joint and the opposing surfaces of the carrier plate and external to the gaskets. The fluid leakage path provides a path for leakage fluid to flow externally from the cylinder head joint during a seal failure.

In still a further aspect of the present invention, a fail safe leakage control system for an internal combustion engine which includes a spacer plate positioned within a cylinder head joint formed by a cylinder head and a cylinder block is provided. The cylinder head joint includes a gap, and the internal combustion engine includes at least a cylinder and an oil drain. In this aspect of the present invention, a carrier plate is positioned between the cylinder head and the cylinder block. A first gasket is formed on a first surface of the carrier plate and a second gasket is formed on a second surface of the carrier plate. A first fluid leakage path is formed between the surface of the cylinder head and the first surface of the carrier late and external to the first gasket, and a second fluid leakage path is formed between a surface of the cylinder block and the second surface of the carrier plate and external to the second gasket.

BRIEF DESCRIPTION OF THE DRAWINGS

The foregoing aspects and advantages will be better understood from the following detailed description of an embodiment of the invention with reference to the diagrammatic drawings, in which.

BEST MODE FOR CARRYING OUT THE INVENTION

Figure 1:
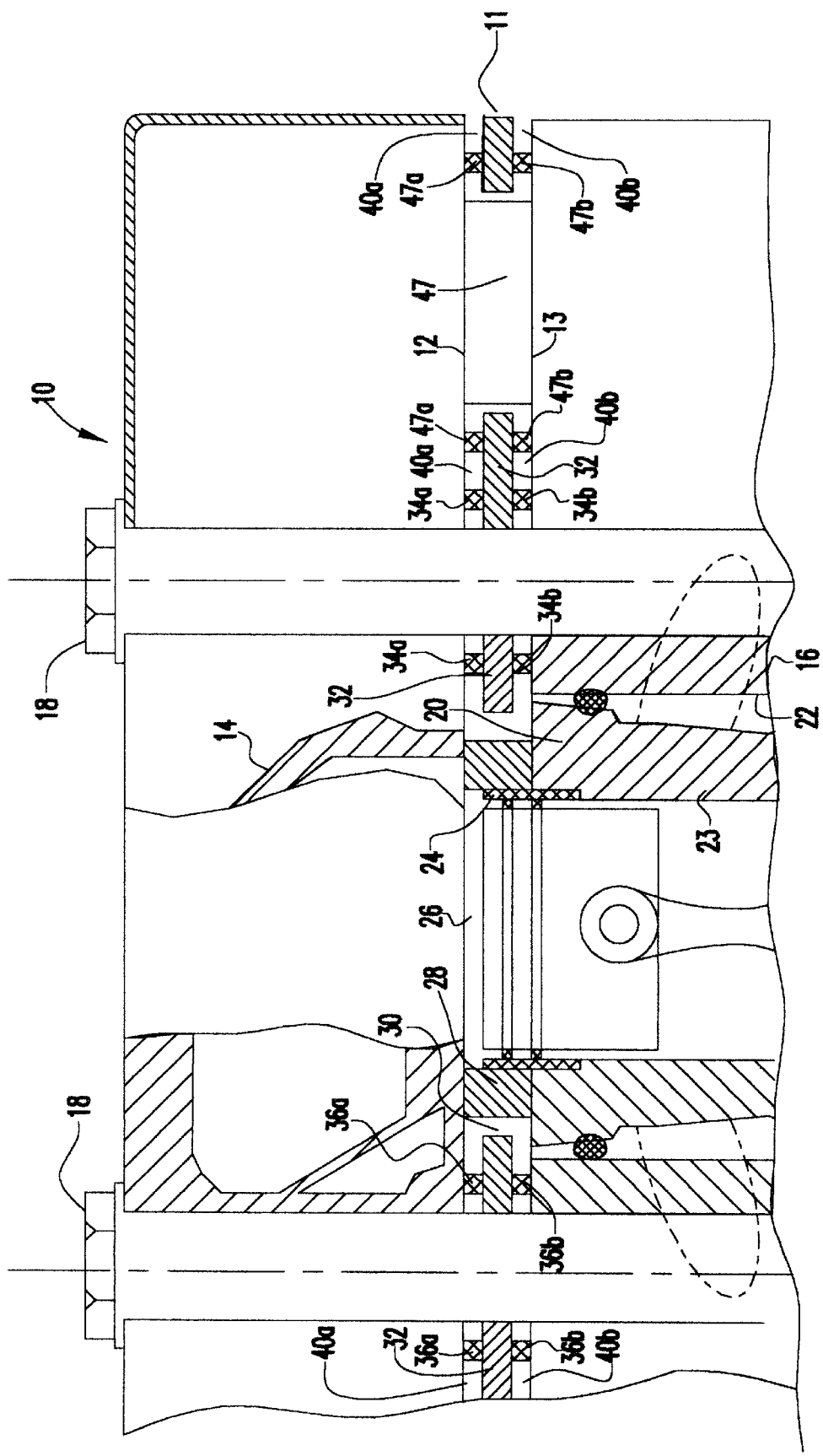
FIG. 1 shows a diagrammatic partial side sectional view of a cylinder head and engine block joint according to an embodiment of the present invention.

Referring now to the drawings, and more particularly to FIG. 1, a partial side sectional view of a cylinder head joint according to an embodiment of the present invention is shown. More specifically, FIG. 1 shows a diesel engine 10 incorporating a cylinder head joint 11 located between a cylinder head 14 and a cylinder block 16. The cylinder head 14 and the cylinder block 16 are mounted to one another via a plurality of cylinder head bolts 18. A replaceable cylinder liner 20 is slidably mounted within a bore 22 of the cylinder block 16, which defines the cylinder chamber 23. A scraper ring 24 is provided on a portion of the interior wall of the cylinder liner 20, and defines a portion of the combustion chamber 26. It is noted that a piston 25 scrapes against the scraper ring 24 in its upper stroke or top dead center position.

Still referring to FIG. 1, at least one spacer plate 28 is mounted between the cylinder head 14 and the cylinder block 16. The spacer plate 28 separates the cylinder head 14 from the cylinder block and forms a gap 30 therebetween. The spacer plate 28 further transfers the load from the cylinder head fasteners 18 into the replaceable cylinder liner 20 thus forming the combustion seal, and may also distribute both the mechanical and thermally induced cylinder head loads throughout the cylinder block 16. In one embodiment, the spacer plate 28 is constructed of metal or alloy and includes a cross section of approximately 4.11 mm thick by 11 mm wide. The resulting gap 30 is approximately 6.25 mm at the cylinder head joint 11 between the cylinder head 14 and the cylinder block 16. It should be well understood that the above dimensions are merely illustrative of one embodiment of the present invention and that other dimensions of both the spacer plate 28 and resulting gap 30 are contemplated for use with the present invention.

In order to prevent contamination of fluids during a gasket failure or other fluid leakage occurrence, fluid leakage paths 40a and 40b are provided within the gap 30 of the cylinder head joint 11. To form the fluid leakage paths 40a and 40b, a one piece carrier plate 32 with at least gaskets 34a, 47a and 34b, 47b are molded or formed on the carrier plate 32 and positioned within the gap 30.

Figure 2:
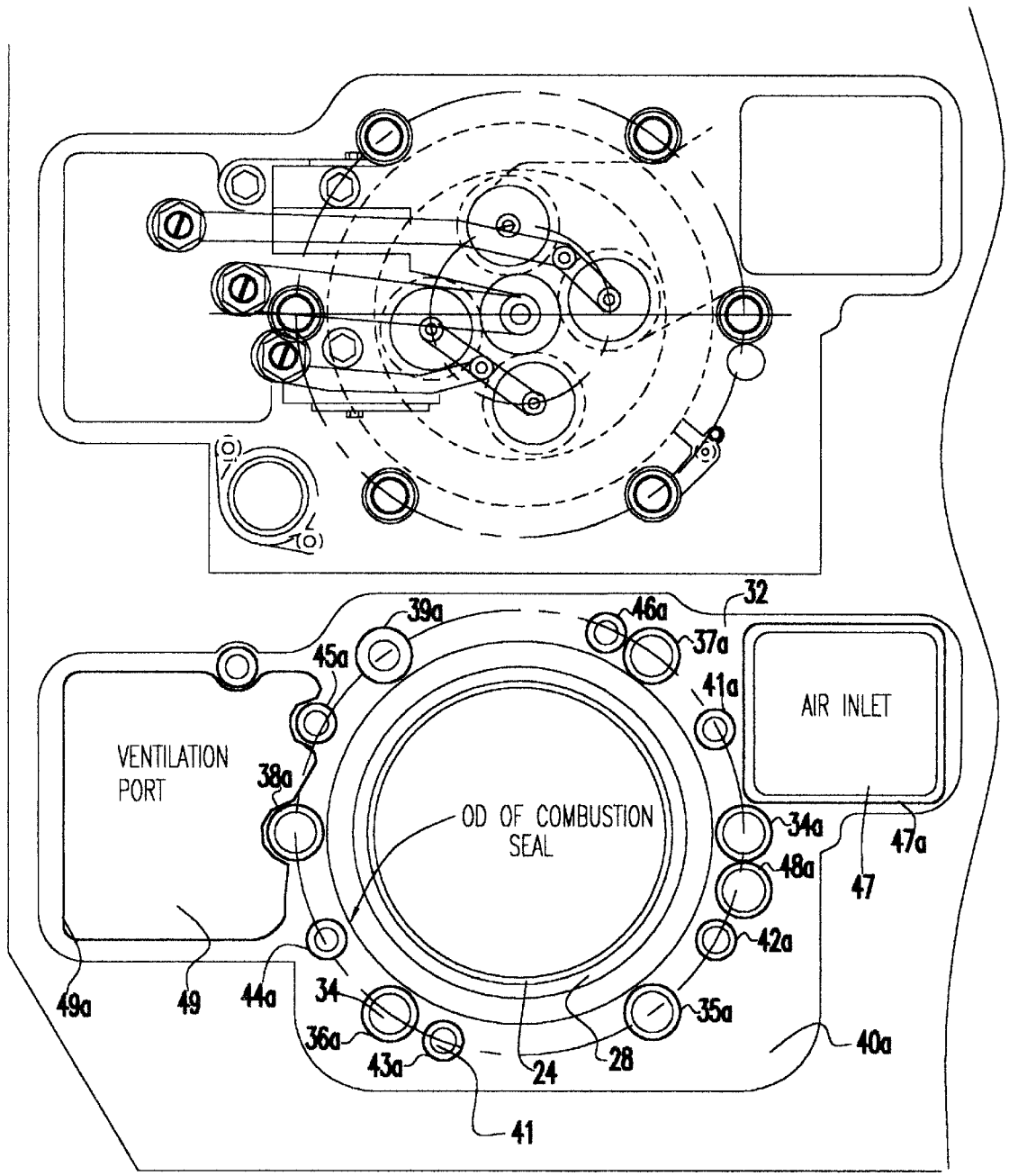
FIG. 2 shows a diagrammatic top sectional view of a cylinder head and engine block joint according to an embodiment of the present invention.

Being more specific, in the assembly of the present invention an upper leakage path 40a is formed between the cylinder head 14, the carrier plate 32 and each of the gaskets 34a and 47a. Similarly, a lower leakage path 40b is formed between the cylinder block 16, the carrier plate 32 and each of the gaskets 34b and 47b. The fluid leakage paths may equally be formed between other gaskets as shown in FIG. 2, such as, for example, gaskets 35a and 43a and/or gaskets 35b and 43b. In this manner, the fluid leakage paths 40a and 40b are separated by the carrier plate 32, and the fluid is channeled away from the components of the engine when any of the gaskets fail.

The fluid leakage paths 40a and 40b allow fluid to flow externally from the cylinder head joint 11 and not into other engine compartments, such as, for example, the combustion chamber or oil drain. This feature thus eliminates the possibility of the fluids within the engine from being contaminated during a gasket failure of other catastrophic event. The fluid leakage paths 40a and 40b further eliminate the need for machining passages within the cylinder head 14 and/or cylinder block 16 in order to provide fail safe leakage in critical joints. It is noted that these machined passages may contribute to an increase in crack initiation in the cylinder block which, in turn, may lead to an engine failure.

In practice, when the cylinder head 14 is mounted on the cylinder block 16 via the cylinder head bolts 18, the gaskets 34a, 34b, 35a, 35b, 37a, 37b, 39a and 39b (etc.) are deformed such that a seal is formed between the cylinder head 14 and the cylinder block 16. This seal, in addition to the seal formed by the spacer 28, prevents leakage of engine fluids. In FIG. 1, the gaskets 34a, 34b, 36a and 36b surround the cylinder head fasteners 18 and the gaskets 47a and 47b surround the air intake port 47. In the preferred embodiment, the gaskets should be compressed 22% to 28% of their original height for good sealing. It is critical to note, however, that the optimal compression of the gaskets clearly depends on the height of the spacer 28 and gaskets (as measured from a surface of the carrier plate 32).

FIG. 2 shows a top sectional view of a cylinder head joint according to one embodiment of the present invention. The carrier plate 32 is located about the cylinder and is designed so as to allow for exact placement of the gaskets about the corresponding engine parts. In the preferred embodiment of the present invention, the carrier plate 32 is a discrete component of the engine, and may be easily replaced or repaired without having to replace other components therein.

FIG. 2 further shows the arrangement of the gaskets 34a, 35a, 36a, 37a, 38a and 39a corresponding to the cylinder head fastener openings 34, and gasket 47a which corresponds to the air inlet 47 (as shown also in FIG. 1). Also, FIG. 2 shows the gaskets 41a, 42a, 43a, 44a, 45a and 46a corresponding to the coolant ports 41, and gasket 48a which corresponds to the oil drain 48. Likewise, the remaining gasket 49a corresponds to the crankcase ventilation port 49. Thus as seen in FIG. 2, each opening or fluid passage is individually sealed on both sides of the carrier plate 32 and the fluid leakage paths may equally be formed between any of gaskets, such as, for example, between gaskets 36a and 45a and/or gaskets 36a and 49a.

In addition, all of the cylinder head hold down fastener openings 34 are sealed on both sides to protect from the outside elements and or possible contaminating fluid leakage. As further seen in FIG. 2, the inner diameter of the of the carrier plate surrounds both the scraper ring 24 and the spacer plate 28, and more preferably surrounds an outer diameter of the spacer plate 28.

To assemble the fluid leakage paths 40a and 40b, the spacer plate 30 is placed on the surface 13 of the cylinder block 16. The discrete carrier plate 32 is then placed on the surface 13 of the cylinder block such that the gaskets molded or otherwise formed thereon correspond to corresponding engine components. In the embodiment shown in FIG. 2, the carrier plate 32 is centered about the cylinder such that the gaskets are located centrally about the corresponding oil drain, coolant ports, fastening openings and the like. Once the spacer plate 30 and carrier plate 32 are provided on the surface 13 of the cylinder block 16, the cylinder head 14 is placed on top of the cylinder block 16 and more accurately on the gaskets formed on the carrier plate 32. The cylinder head 14 is then bolted to the cylinder block 16 until the cylinder head 14 rests on the spacers 28. At this point, the pressure created from the loading of the cylinder head deforms the gaskets and creates both a seal and fluid leakage paths.

Figure 3:
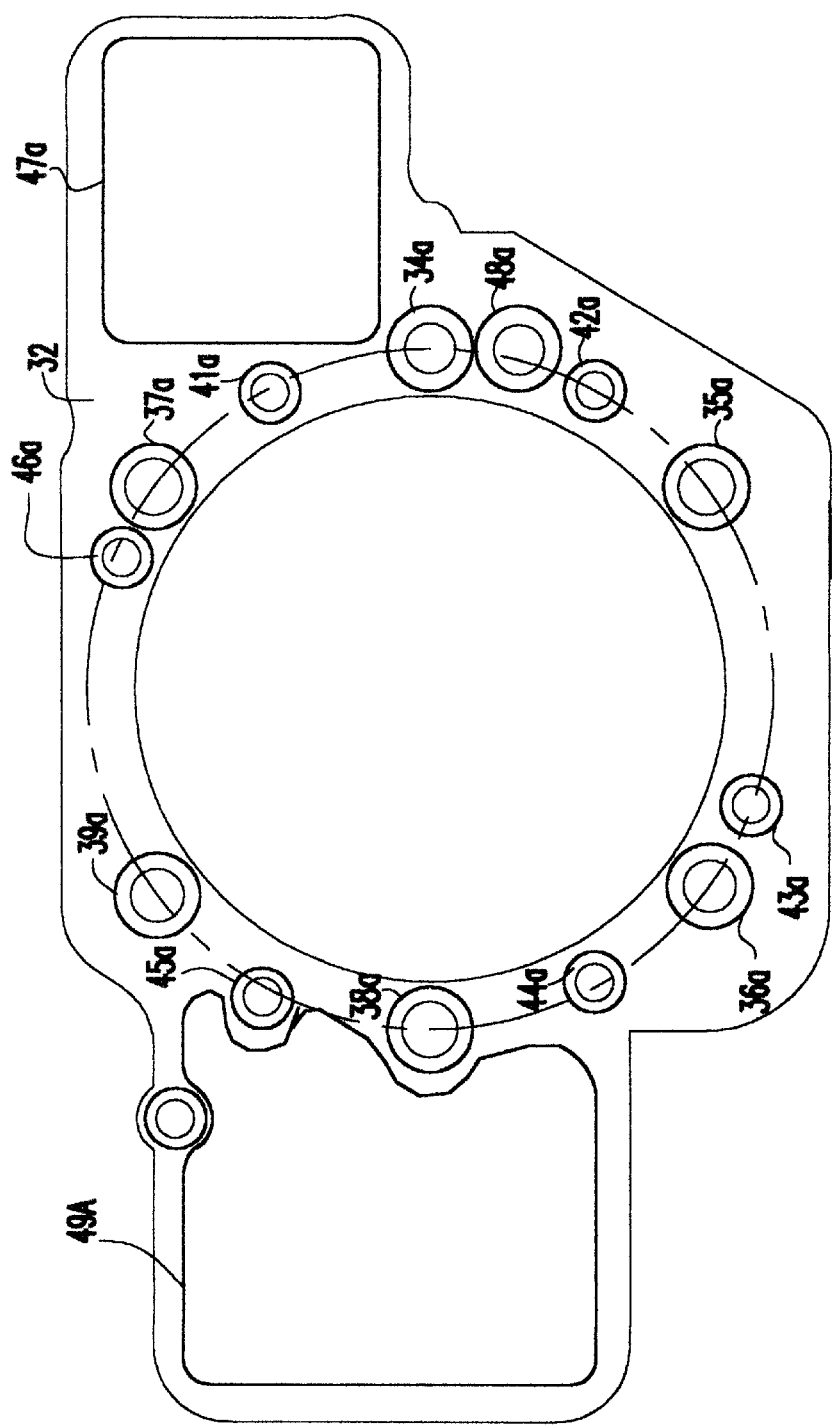
FIG. 3 shows a diagrammatic top plan view of an embodiment of an integral gasket of the present invention.

FIG. 3 shows a top plan view of the carrier plate 32 and the gaskets. It is noted that a bottom view is substantially identical to the top view shown in FIG. 3. The carrier plate 32 may be manufactured from metal or plastic such as 30% glass filled nylon, polyether sulfone or polyether etherketone. In addition, the carrier thickness must in all tolerance conditions be less than the minimum gap 30 between the cylinder head and the cylinder block. The gaskets may be elastomeric seals bonded to the carrier plate 32, and are preferably constructed of a flexible elastomer such as either a highly saturated nitrile rubber (HSN) or a fluorocarbon such as a vinylidene fluoride—hexafluoropropylene copolymer (Viton). The carrier plate 32 preferably has a thickness of approximately 4.94 mm which thus results in fluid leakage paths of approximately 0.8 mm.

It is further recognized that each of the elastomeric gaskets have tolerance conditions less than the minimum gap 30 between the cylinder head 14 and the cylinder block 16. Moreover, the height or thickness of the elastomeric gaskets are designed to be of sufficient height or thickness so as to provide a good elastomeric material displacement for sealing within the cylinder head joint 11.

Figure 4:
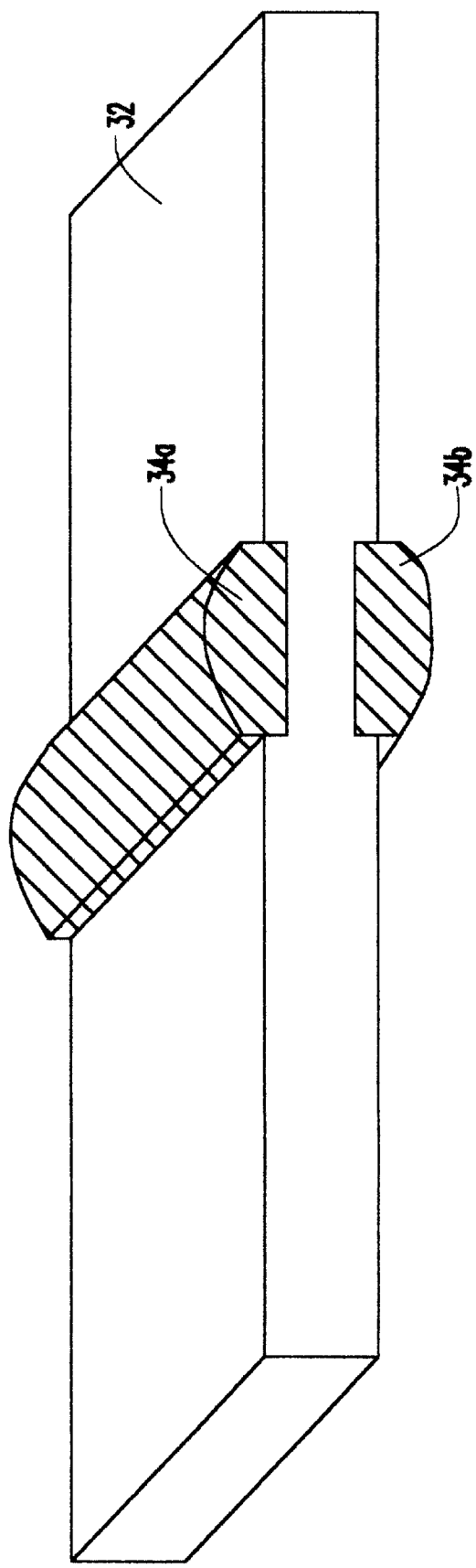
FIG. 4 shows a diagrammatic partial side sectional view of the integral gasket of the present invention.

FIG. 4 shows a partial side sectional view of one of the gaskets of the present invention. As seen in FIG. 4, the elastomeric gaskets extend outward from the upper and lower surfaces of the carrier plate 32. This allows the elastomeric gaskets to seal against the surface 12 of the cylinder head 14 and the surface 13 of the cylinder block 16, while at the same type providing the fluid leakage paths of the present invention. Under pressure, the elastomeric gaskets are deformed preferably into a square configuration. As previously discussed, the pressure of the cylinder head 14 and cylinder block 16 maintains a seal between the between the gaskets and the surface 12 of the cylinder head 14 and the surface 13 of the cylinder block 16. This applied pressure also assists in maintaining the carrier plate 32 and sealing gaskets in proper alignment with corresponding engine components.

It is noted that FIGS. 1–4 merely show one embodiment of the sealing-fail safe leakage control system of the present invention. However, it should be understood by one of ordinary skill in the art that the sealing-fail safe leakage control system of the present invention can be made of many materials and engineered to accommodate various types of engines and the like. Therefore, the specific dimensions of the sealing-fail safe leakage control system, including length, width, shape and other variables and quantities specified herein may vary with the type and size of engine and engine parts being used with the system contemplated herein. Accordingly, the specific embodiment discussed with reference to FIGS. 1–4 is provided herein for illustrative purposes and in no way should the present invention be construed to be limited in scope to this one embodiment.

INDUSTRIAL APPLICABILITY

The present invention is directed to a cylinder head sealing system having a fail safe leakage control system. In particular, the fail safe leakage control system of the present invention provides fluid leakage paths which allow any sealed fluid to leak externally from the cylinder head joint and not contaminate any other vital fluids. This feature permits the engine to "limp home" or continue operation until a permanent repair can be made to the engine.

The leak paths are formed external to molded gaskets which thus allow fluid to flow a least resistance path externally from the cylinder head (e.g., the leak passages channel fluid away from the components of the engine when the gaskets fails). Thus, in use when one of the seals fails, the fluid may flow within the fluid leakage paths externally from the cylinder head joint. This prevents the fluid from flowing within the cylinder or other engine ports and contaminating the fluids therein. The present invention thereby prevents fluids from being contaminated within each other during a seal failure or the like.

Other aspects, object and advantages of this invention can be obtained from a study of the drawings, the disclosure and the appended claims.

We claim:

1. A fail safe leakage control system for an internal combustion engine, comprising:
   a carrier plate having opposing surfaces, the carrier plate being positioned within a cylinder head joint, the cylinder head joint having surfaces;
   a gasket positioned on each of the opposing surfaces of the carrier plate, the gaskets forming a seal between the surfaces of the cylinder head joint; and
   a fluid leakage path formed between the surfaces of the cylinder head joint and the carrier plate and externally to the gaskets the fluid leakage path providing a path for leakage fluid to flow externally from the cylinder head joint of the internal combustion engine during a seal failure.

2. The fail safe leakage control system of claim 1, wherein
the cylinder head joint includes a cylinder block and a cylinder head, the cylinder block and the cylinder head each includes a surface,
the opposing surfaces of the carrier plate includes an upper surface and a bottom surface, and
the fluid leakage path includes an upper fluid leak path formed between the surface of the cylinder head and the upper surface of the carrier plate and externally to the gaskets disposed on the upper surface of the carrier plate.

3. The fail safe leakage control system of claim 2, wherein the fluid leak path further includes a lower fluid leakage path formed between the surface of the cylinder block of the cylinder head joint and the bottom surface of the carrier plate and externally to the gaskets formed on the bottom surface of the carrier plate.

4. The fail safe leakage control system of claim 1, wherein openings or fluid passages of the engine are individually sealed on both sides of the carrier plate by the gaskets.

5. The fail safe leakage control system of claim 1, further including a spacer plate for forming a gap within the cylinder head joint, the gaskets having a predetermined tolerance range less than a minimum predetermined gap range between the surfaces of the cylinder head joint.

6. The fail safe leakage control system of claim 1, wherein the gaskets each have a thickness providing a predetermined amount of elastomeric material displacement and sealing within the cylinder head joint while forming the fluid leakage path.

7. The fail safe leakage control system of claim 1, further including a plurality of the gaskets disposed on the opposing surfaces of the carrier plate, wherein the fluid leakage path is formed between the surfaces of the cylinder head joint and the carrier plate and external to the plurality of gaskets formed on the opposing surfaces of the carrier plate.

8. The fail safe leakage control system of claim 7, wherein the carrier plate is a discrete component of the internal combustion engine and the plurality of gaskets are molded onto the opposing surfaces of the carrier plate.

9. The fail safe leakage control system of claim 1, wherein the gaskets extend outwardly from the opposing surfaces of the carrier plate.

10. The fail safe leakage control system of claim 1, wherein the cylinder head joint includes a gap formed between facing surfaces of a cylinder block and a cylinder head.

11. The fail safe leakage control system of claim 1, wherein the carrier plate has a thickness of approximately 4.9 mm and thereby forming the fluid leakage path with a height of approximately 0.8 mm.

12. A fail safe leakage control system for an internal combustion engine comprising:
a cylinder head joint, the cylinder head joint being formed by a cylinder head and a cylinder block, the cylinder head and the cylinder block each having a surface;
a spacer plate positioned between the cylinder head and the cylinder block;
a gap formed between the cylinder head and the cylinder block;
a cylinder, oil drain and bolt each associated with the cylinder head and the cylinder block;
a carrier plate positioned between the cylinder head and the cylinder block, the carrier plate having a first surface and a second surface;
a first gasket formed on the first surface of the carrier plate;
a second gasket formed on the second surface of the carrier plate;
a first fluid leakage path disposed between the surface of the cylinder head and the first surface of the carrier plate and externally to the first gasket; and
a second fluid leakage path disposed between the surface of the cylinder block and the second surface of the carrier plate and being further disposed externally to the second gasket.

13. The fail safe leakage control system of claim 12, wherein the first and second gaskets form individually seals about the at least cylinder, oil drain and bolt about the first and second surfaces of the carrier plate.

14. The fail safe leakage control system of claim 12, wherein the first and second gaskets have a thickness providing a predetermined amount of elastomeric material displacement and sealing within the cylinder head joint while forming the fluid leakage path.

15. The fail safe leakage control system of claim 12, further including:
a first set of gaskets including the first gasket; and
a second set of gaskets including the second gasket, wherein
the first fluid leakage path being external to the first set of gaskets; and
the second fluid leakage path being external to the second set of gaskets.

16. A fail safe leakage control system for an internal combustion engine comprising:
a cylinder head joint, the cylinder head joint being formed by a cylinder head and a cylinder block, the cylinder head and the cylinder block each having a surface;
a spacer plate positioned between the cylinder head and the cylinder block;
a gap formed between the cylinder head and the cylinder block;
a cylinder, oil drain and bolt each associated with the internal combustion engine;
a carrier plate positioned between the cylinder head and the cylinder block, the carrier plate having a first surface and a second surface;
a first gasket formed on the first surface of the carrier plate;
a second gasket formed on the second surface of the carrier plate;
a first fluid leakage path disposed between the surface of the cylinder head and the first surface of the carrier plate and externally to the first gasket; and
a second fluid leakage path disposed between the surface of the cylinder block and the second surface of the carrier plate and being further disposed externally to the second gasket,
wherein the carrier plate is a discrete component of the internal combustion engine and the first and second gaskets are molded onto the first and second surfaces of the carrier plate.

17. A fail safe leakage control system comprising:
sealing means for sealing components of an engine; and
passage means for providing a fluid flow path external to the means for sealing, the fluid flow path channeling fluid away from the components of the engine when the sealing means fails, wherein the passage means includes an upper fluid flow path and a lower fluid path separated by a carrier plate means which is a discrete component and the sealing means is a first and a second gasket molded onto the first and second surfaces of the carrier plate means.

* * * * *